US009315370B2

(12) United States Patent
Anselmino et al.

(10) Patent No.: US 9,315,370 B2
(45) Date of Patent: Apr. 19, 2016

(54) MULTI-SINGLE SERVE BEVERAGE DISPENSING APPARATUS, METHOD AND SYSTEM

(71) Applicant: WHIRLPOOL CORPORATION, Benton Harbor, MI (US)

(72) Inventors: Philip A. Anselmino, Chicago, IL (US); Kevin M. Chase, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/708,434

(22) Filed: May 11, 2015

(65) Prior Publication Data

US 2015/0239723 A1 Aug. 27, 2015

Related U.S. Application Data

(62) Division of application No. 12/915,210, filed on Oct. 29, 2010, now Pat. No. 9,062,912.

(51) Int. Cl.

| | |
|---|---|
| ***A47J 31/06*** | (2006.01) |
| ***B67D 7/74*** | (2010.01) |
| ***B67D 7/80*** | (2010.01) |
| ***B67D 1/00*** | (2006.01) |
| ***F25D 23/12*** | (2006.01) |

(52) U.S. Cl.
CPC ............ *B67D 1/0021* (2013.01); *F25D 23/126* (2013.01)

(58) Field of Classification Search
CPC ............ A47J 31/3614; B65D 85/8043; B65D 81/3222; B65D 81/3283; B05B 11/3057; F25D 23/061; F25D 23/062; F25D 23/126
USPC ........ 99/289 R, 290, 291, 293, 295; 222/129, 222/129.1, 129.4, 146.1, 146.6, 325; 62/389, 441
See application file for complete search history.

(56) References Cited

U.S. PATENT DOCUMENTS

| | | | | |
|---|---|---|---|---|
| 5,590,809 | A * | 1/1997 | Prescott et al. | 221/1 |
| 2004/0237793 | A1* | 12/2004 | Zurcher et al. | 99/275 |

* cited by examiner

*Primary Examiner* — Dana Ross
*Assistant Examiner* — Lindsey C Teaters

(57) ABSTRACT

A multi-single serve beverage dispensing apparatus, method and system is disclosed. Storage, management and delivery of a desired liquid enhancement cartridge to a beverage preparation positioned in a refrigerator or other liquid dispensing appliance is provided. A liquid dispensing cartridge is inserted and retrieved through a cartridge loading/unloading interface associated with a cabinet body of a liquid dispensing appliance. A storage system having multiple cartridge holding positions for storing and staging a variety of liquid enhancement cartridges is included. An indexing system has a means for moving one or more of the cartridges into a beverage preparation position for preparing and dispensing a beverage.

19 Claims, 8 Drawing Sheets

MULTI-SINGLE SERVE BEVERAGE DISPENSING APPARATUS, METHOD AND SYSTEM

CROSS-REFERENCE TO RELATED APPLICATIONS

The present application represents a divisional application of U.S. patent application Ser. No. 12/915,210 entitled "Multi-Single Serve Beverage Dispensing Apparatus, Method and System" filed Oct. 29, 2010, currently allowed.

FIELD OF THE INVENTION

The present invention relates to the storage, management and delivery of multiple single serving, liquid enhancement cartridges in a liquid dispensing appliance, and more particularly, to apparatuses, methods and systems for storing, managing and delivering multiple single serve, liquid enhancement cartridges to a beverage preparation position in a refrigerator for dispensing or preparing beverages.

BACKGROUND OF THE INVENTION

Dispensing liquid from an indoor dispenser of a refrigerator or other liquid dispensing appliance or device is well-known. In fact, many new and existing refrigerators have an indoor or other dispenser having a liquid outlet to dispense liquid from the refrigerator. Although these existing refrigerators can dispense liquid from a dispenser, including ice from an ice dispenser, no concept or platform exists where the refrigerator, or other liquid dispensing appliance, is configured to receive, store, transfer, and manage a plurality of single serve liquid enhancement cartridges within the liquid dispensing appliance or refrigerator for providing a platform for preparing a variety of flavored beverages at the appliance. Therefore, a need has been identified in the art to provide a refrigerator, or other liquid dispensing appliance, having the advantage of being able to receive, store, deliver, and manage the handling of multiple single serving liquid enhancement cartridges whereby one or more of them are presented at a beverage preparation position in the appliance for preparing a beverage at the appliance for drinking or for other uses.

Beverage industries are known to use single serving cartridges for preparing beverages in both residential and commercial settings. These cartridges, for example, may include coffee grounds for preparing a brewed beverage. Current cartridge designs do not allow for controlling the concentration level of the beverage being prepared using structure associated with the cartridge. Therefore, a need has been identified in the art to provide a liquid enhancement cartridge configured with multiple sub-compartments having quantified amounts of a liquid enhancement component for use in dispensing one or several of the compartments for controlling the concentration of the beverage being prepared.

BRIEF SUMMARY OF THE INVENTION

It is a primary object, feature or advantage of the present invention to improve over the state of the art.

It is a further object, feature or advantage of the present invention to provide a liquid dispensing appliance equipped with a multi-single serve beverage dispensing system.

Yet another object, feature or advantage of the present invention is to provide a refrigerator having a multi-single serve beverage dispensing system.

A still further object, feature or advantage of the present invention is to provide a liquid enhancement cartridge segmented into multiple sub-compartments for controlling the concentration of the beverage being produced at the liquid dispensing appliance or refrigerator.

One of these and/or other objects, features or advantages of the present invention will become apparent from the specification and claims that follow.

According to one aspect of the present invention, a refrigerator is disclosed. The refrigerator includes a cabinet body having a dispenser that includes a liquid pathway with an inlet in communication with a liquid source and an outlet in communication with a dispensing area. The refrigerator also includes a cartridge loading interface associated with the cabinet body. The interface is configured to receive a cartridge having a liquid enhancement component. A storage system is associated with the cartridge loading interface. The storage system has a storage device with multiple cartridge holding positions for staging a plurality of cartridges proximate a beverage preparation position. An indexing system includes means for moving one or more of the cartridges into the beverage preparation position between the inlet and outlet of the liquid pathway for passing liquid through the cartridge for preparing and dispensing a beverage at the dispensing area. In a preferred form, the storage device includes one or more channels, belts, clips, chutes, columns, carousels, magazines, or wheels having cartridge holding positions for storing a plurality of cartridges. The cartridge moving means includes an actuator in operable connection with the channel, belt, clip, chute, column, carousel, magazine, or wheel. The indexing system may also include a cartridge service system having a shuttle for moving a cartridge from the storage system into the beverage preparation position.

According to another aspect of the present invention, a multi-single serve cartridge beverage dispensing system is disclosed. This system includes a cartridge loading interface that is configured to receive a cartridge having a liquid enhancement component, a storage system associated with the cartridge loading interface that has a storage device with a plurality of cartridge holding positions for staging cartridges approximate the beverage preparation position, and an indexing system with means for moving one or more of the cartridges into a liquid pathway at the beverage preparation position for passing liquid through the cartridge for preparing and dispensing a beverage at a dispensing area. In a preferred form, the system also includes an actuator for moving or rotating the storage device for staging a cartridge in the storage device at the beverage preparation position. The system is for use in combination with a refrigerator or an ice water dispenser of a refrigerator.

According to another aspect of the present invention, a new method for dispensing a beverage from a host appliance by storing and dispensing from multiple beverage cartridges is disclosed. The method includes the steps of providing a beverage dispensing system at the host appliance having a beverage preparation position, introducing a plurality of cartridges having a liquid enhancement component into the host appliance, staging the cartridges at the beverage preparation position in a cartridge holder, indexing the cartridge holder or a cartridge from the holder into the beverage preparation position, dispensing liquid to the beverage preparation position to pass through the cartridge for dispensing a beverage from the host appliance, and iterating the cartridge holder or a cartridge at the beverage preparation position for preparing another beverage. In a preferred form, the method also includes the steps of controlling concentration levels of the beverage by dispensing from one or more sub-compartments for preparing a beverage having a first drink strength by dispensing from a first number of sub-compartments of the cartridge and another beverage having a second drink strength greater than the first by dispensing from a second number of sub-compartments greater than the first number of sub-compartments.

BRIEF DESCRIPTION OF THE DRAWINGS

While the specification concludes with the claims particularly pointing out and distinctly claiming the invention, it is believed that the present invention will be better understood from the following description taken in conjunction with the accompanied drawings, in which:

DETAILED DESCRIPTION OF THE PREFERRED EMBODIMENTS

The present invention is directed to a refrigerator or other liquid dispensing device or appliance such as a countertop/tabletop water dispenser, water dispensing cabinet, or beverage vending machine. In particular, the present invention provides for a refrigerated appliance, or other liquid dispensing device or appliance, having a multi-single serve beverage dispensing system providing for the receipt, delivery, management, and handling of a plurality of liquid enhancement cartridges to a beverage preparation position in the refrigerator or appliance for preparing a beverage at the appliance.

Figure 1:
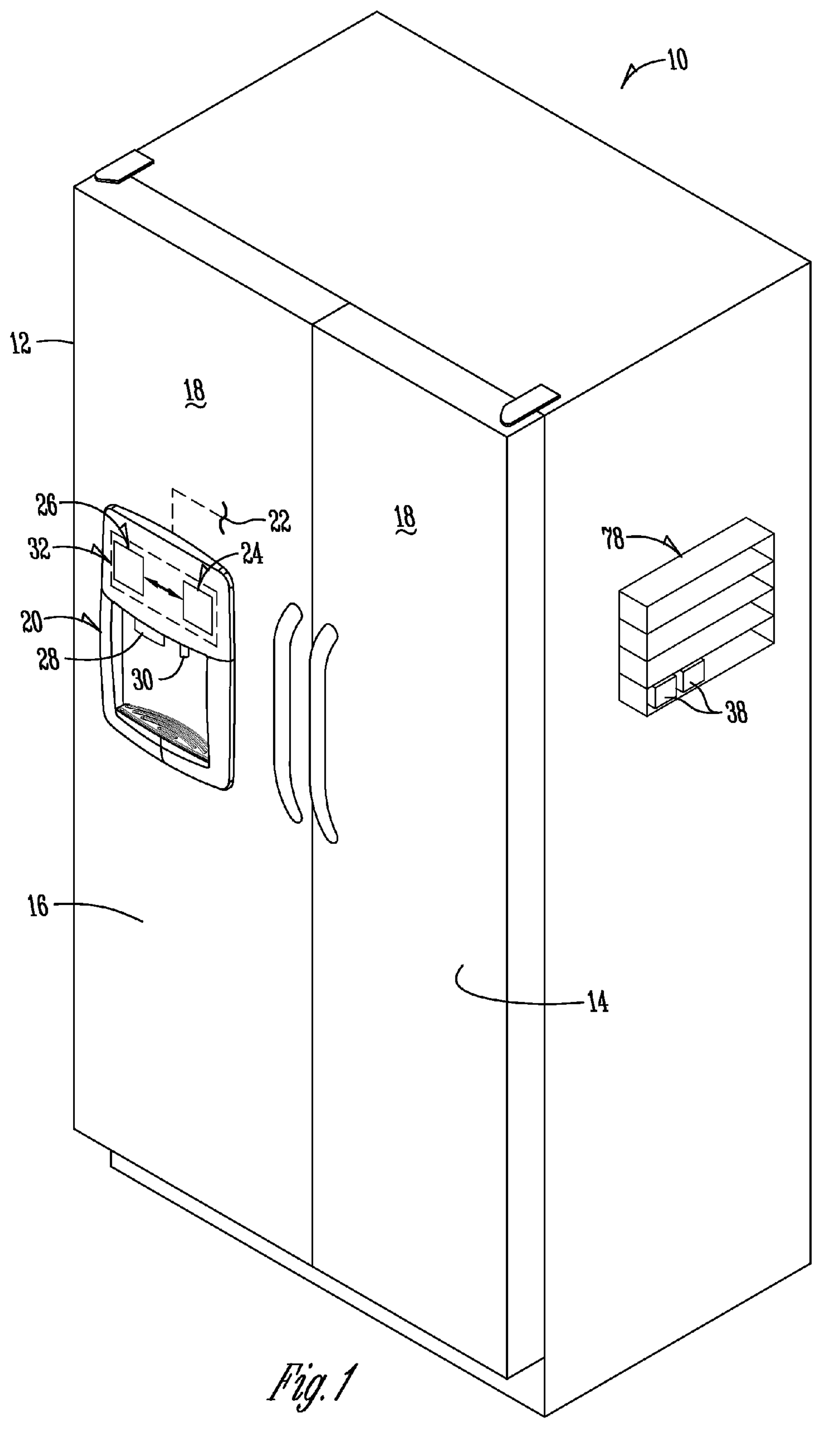
FIG. 1 is a front elevation view of a refrigerator illustrating a system for a multi-single serve beverage dispensing system for providing preparation of a beverage at the refrigerator in accordance with one aspect of the present invention.

FIG. 1 illustrates a refrigerator 10 having a cabinet body 12 including a refrigerated compartment 14 and a freezer compartment 16 associated with the cabinet body 12. The refrigerator 10 includes a dispenser 20, such as a liquid and/or ice/water dispenser, in one of the doors 18 of the refrigerator 10. As is customary, the dispenser 20 receives liquid from a liquid source 22, such as a plumbed water line associated with a domestic, commercial or residential dwelling. Liquid source 22 could also be a bottled source such as where water is stored and dispensed from a bottle at or remote to the refrigerator or other liquid dispensing appliance. Liquid from source 22 may be stored in a liquid holding reservoir (not shown), before or after being filtered through an in-line filter, and communicated to the beverage preparation system 24. The dispenser 20 includes one or both of an ice dispenser 28 and liquid dispenser 30 for dispensing ice and/or liquid from the dispenser. Dispenser 20 also includes a beverage preparation system 24 in operable communication with a liquid enhancement index, storage and service system 26. The beverage preparation system 24 and liquid enhancement index, storage and service system 26 operate together to provide a beverage dispensing system 32.

In one form of the invention, as illustrated in FIG. 1, the refrigerator 10 or other liquid dispensing appliance, such as a tabletop/countertop dispenser or cabinet dispenser, may be configured with a cartridge holder 78. The cartridge holder 78 may be configured of one or more clips, magazines, tracks, channels, columns, or chutes configured to receive a plurality of the liquid enhancement cartridges of the present invention. The cartridge holder 78 may have a magnet or other attachment means for allowing the holder to be positioned and held to the cabinet body 12 of refrigerator 10 or another liquid dispensing appliance to which the cartridge holder 78 is attached. The cartridge holder 78 could be mounted to refrigerator 10 either externally or internally. For example, in the case where the liquid enhancement component with the cartridges 38 requires refrigeration, the cartridge holder 78 could be positioned within the refrigerated compartment 14. Similarly, if it is desirable that the liquid enhancement component in the cartridges 38 be frozen, the cartridge holder 78 could be positioned within the freezer compartment 16 of refrigerator 10. The structure of the holder 78 may be arranged so that indicia positioned on the cartridge is viewable to the operator or user to facilitate management and selection of the same. Additionally, the configuration of the holding or retaining members of the cartridge holder 78 may be arranged or configured so that the cartridges 38 may be staged or indexed according to preference, ingredient, and information included on the cartridge or other preferences of the user or operator. The cartridge holder 78 may also be configured to hold or retain one or more members used to store cartridges for use in the cartridge storage, index and service system 26. For example, the cartridge holder 78 could be configured to hold or retain one or more clips or magazines filled with a number of cartridges. These clips or magazines will be further described in detail and by way of diagrams in the following descriptions of the invention.

Figure 2:
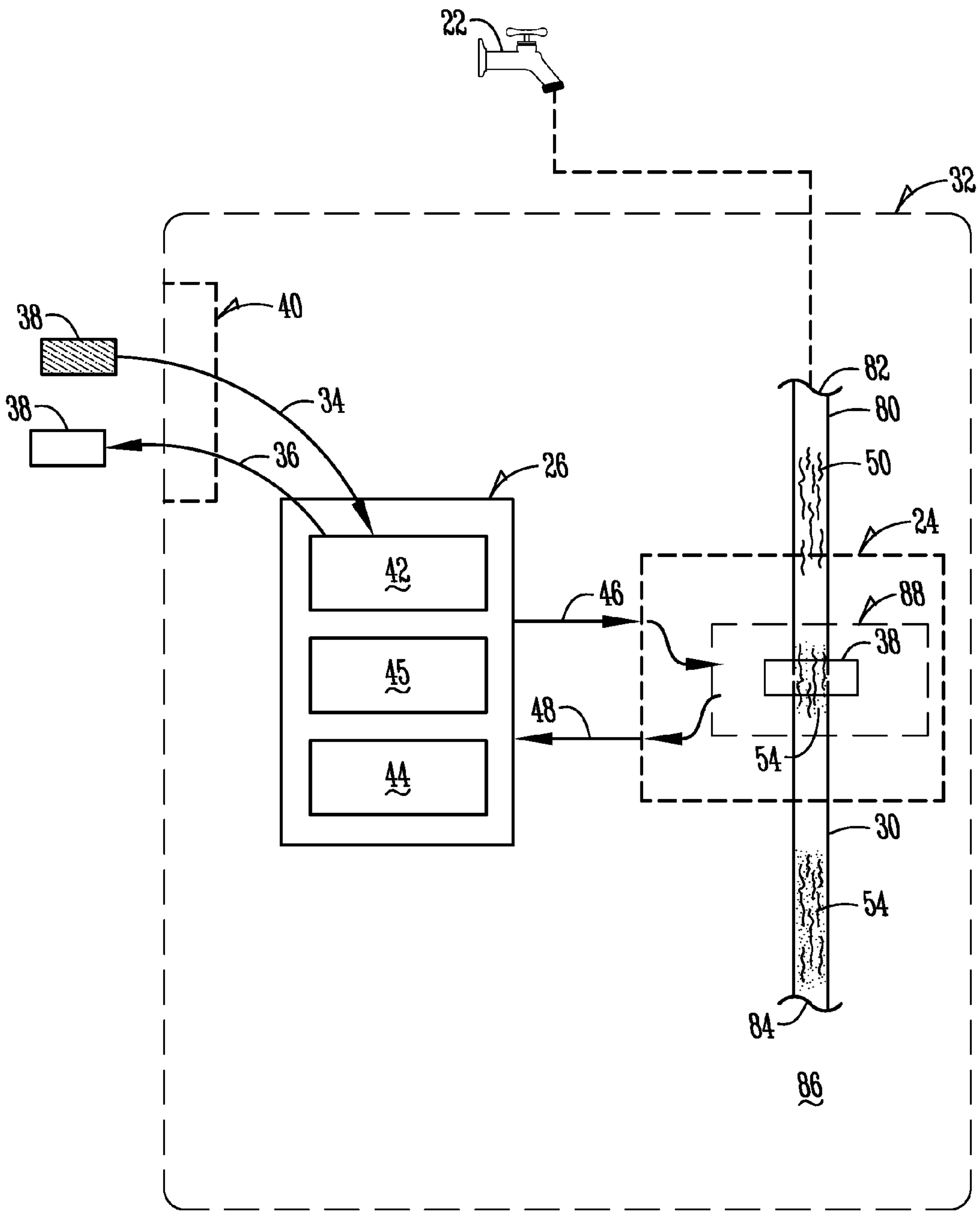
FIG. 2 is a diagrammatical illustration of a beverage dispensing system according to one aspect of the invention.

FIG. 2 is an illustration of a diagram characterizing various components of a beverage dispensing system 32 according to one aspect of the invention. The beverage dispensing system 32 may be used with any liquid dispensing appliance or device, such as a refrigerator having an ice and/or water dispenser. As is customary with most liquid dispensing appliances or devices, each includes a liquid pathway 80 having an inlet 82 in communication with a liquid source 22 and an outlet 84 in communication with a dispensing area 86. In the present invention, a beverage preparation system 24 is incorporated at the liquid pathway 80. The beverage preparation system 24 includes a beverage preparation position 88. The beverage preparation position 88 is positioned in the liquid pathway 80 between the inlet 82 and outlet 84. The position of the beverage preparation position 88 is such that liquid 50 passing through the liquid pathway 80 passes through a liquid enhancement cartridge 38 so as to combine with a liquid enhancement component 54 in the cartridge 38 and dispense at the outlet 84 of a liquid dispenser 30 as a beverage 54. Liquid 50 may be combined with or affected by a liquid enhancement component in the cartridge by rupturing or piercing a membrane (such as a seal) at an inlet and outlet of the cartridge 38.

Cartridge storage, index and service system 26 is configured to operate in companionship with beverage preparation system 24. The cartridge storage, index and service system 26 may be located proximate the beverage preparation system 24 within the beverage dispensing system 32 of the present invention. Embodiments of the present invention provide the necessary functionality to allow the cartridge storage, index and service system 26 to be positioned, if necessary, in a non-contiguous position relative to beverage preparation system 24. The cartridge storage, index and service system 26 provides the necessary functionality for introducing a cartridge 38 having a liquid enhancement component into the beverage preparation position 88, and retrieving the cartridge 38 from the beverage preparation position 88 to allow for subsequent cartridges to be introduced at the beverage preparation position 88 depending on the type of beverage being prepared. The cartridge storage, index and service system 26 includes a cartridge loading/unloading interface 40 by which a user or operator loads (see arrow 34) fresh cartridges 38 into the cartridge storage, index and service system 26 and unloads (see arrow 36) spent cartridges 38 from the system. The cartridge loading/unloading interface 40 may be configured wholly or partially in the interior or exterior of the cabinet body 12 (FIG. 1) for a refrigerator 10 (FIG. 1) or another liquid dispensing appliance/device. For example, the cartridge loading/unloading interface 40 may be positioned on an exterior portion of the cabinet body 12 of refrigerator 10 shown in FIG. 1. The cartridge loading/unloading interface 40 may also be positioned within a compartment, such as the refrigerated compartment 14 or freezer compartment 16 of cabinet body 12 of the refrigerator 10 shown in FIG. 1. Any part or all of the cartridge storing system 42, cartridge indexing system 44 or cartridge service system 45 may be housed within the cabinet body or a compartment within the same. The compartment may be configured to be accessible by an operator or user through a cartridge loading/unloading interface 40.

The cartridge storage, index and service system 26 includes one or more systems providing the function of storing, indexing, iterating, managing and transferring cartridges to and from the beverage preparation system 24. One or more cartridges 38 are loaded into the beverage preparation system 24 from the cartridge storage, index and service system 26 through loading route 46 and unloaded from the beverage preparation system 24 via retrieval route 48.

The cartridge storage, index and service system 26 includes, in one embodiment of the invention, a cartridge storage system 42, a cartridge indexing system 44 and a cartridge service system 45. These systems will be described in detail in the following paragraphs. One or more of the systems contained in the cartridge storage, index and service system 26 may be combined as a single system. For example, the cartridge indexing and service system may be combined as one system or the cartridge storage, indexing and service system may be combined as a single system of the invention.

Figure 3:
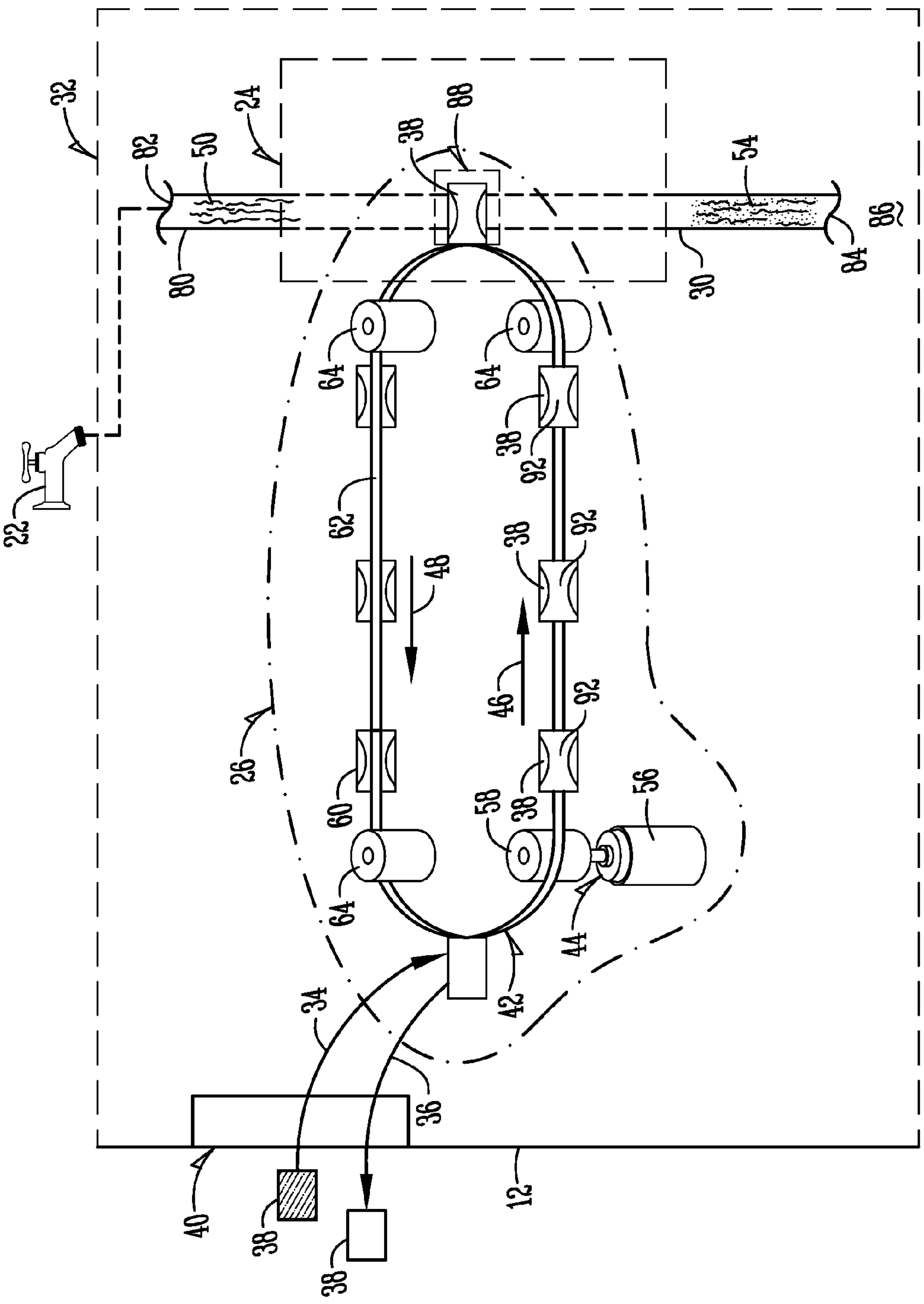
FIG. 3 is an illustration of a beverage preparation system of the present invention.

FIG. 3 illustrates a cartridge storage, index and service system 26 according to one exemplary aspect of the invention. As indicated in FIG. 2, fresh cartridges 38 are introduced and spent cartridges 38 are retrieved from the cartridge storage, index and service system 26 via cartridge loading/unloading interface 40 in cabinet body 12 (FIG. 1). A fresh cartridge 38 may also be loaded (along the path illustrated by arrow 34) through the cartridge loading/unloading interface 40, and a spent cartridge 38 may be unloaded (along the path illustrated by arrow 36) through the same or another interface. The cartridge loading/unloading interface 40 could be configured so that fresh cartridges are introduced through one interface whereas spent cartridges are retrieved through another interface at the cabinet body 12. In one form of the invention, fresh cartridges 38 are loaded into the cartridge storage system 42 and spent cartridges 38 are retrieved from the cartridge storing system 42.

The cartridge storage, index and service system 26 illustrated in FIG. 3 is one example of the present invention wherein the cartridge storage system, cartridge indexing system and cartridge service system are combined into a single system. In the embodiment illustrated in FIG. 3, a belt 62 or other continuously linked bands, straps or chains may be used to form a structure upon which are configured a plurality of cartridge holding positions 92. The cartridge holding positions 92 may be staged at intervals along the belt 62 at a sufficient distance apart from one another to allow for one cartridge to be presented at the beverage preparation position 88 without obstruction of the adjacent most cartridge holding position 92 or beverage cartridge 38 either in front of or in back of the cartridge. The cartridge holding positions 92 may be constructed of a device where the cartridge rests upon a platform or where the cartridge is positively retained. Other fits are contemplated such as a configuration where the cartridge is supported and retained in the cartridge holding position 92 by a tension fit. The cartridge holding position 92 could be configured as a clip where the cartridge 38 is clipped into the hold position 92. Other means for retaining cartridges at each of the holding positions 92 are contemplated. For example, an elastic band could be used to retain the cartridge at the holding position 92. The cartridge could be configured with connecting hardware, structure or geometry that allows the cartridges to be snapped to and held by the cartridge holding position 92. Similarly, the belt 62 may be configured with supporting hardware, clasps, or other geometry configurations for retaining a cartridge at each of the holding positions 92 on belt 62. The belt 62 is rotatably supported by a plurality of pulleys 64. The belt 62 may also be rotatably supported by diametrically opposed gears. In either case, pulleys, cogged or otherwise, including gears may be disposed within the interior of the belt 62 to rotatably support movement of belt 62 along both a loading route 46 and a retrieval route 48. A drive pulley, such as a cogged pulley or a gear 58 driven by actuator 56, such as a motor, may be used to provide rotation of belt 62. The cartridge storage, index and service system 26 illustrated in FIG. 3 combines the functions of storage, indexing and servicing. The belt 62 includes cartridge holding positions 92 for storing a number of cartridges 38. The belt 62 rotates into and out of the beverage preparation position 88 for indexing each of the cartridges into and out of the beverage preparation position 88. The rotation of belt 62 provides the function of servicing a cartridge to and from the beverage preparation position 88. Actuator 56 may be in operable communication with a controller receiving instructions from a user interface on the cabinet body 12 (FIG. 1). In operation, the controller receives instructions to provide rotation of belt 62 to move a cartridge 38 into the beverage preparation position 88 at the beverage preparation system 24. As previously discussed supra, a cartridge is rotated into the beverage preparation position 88 so that an inlet and outlet of the cartridge 38 are brought into communication with the liquid pathway 80. Liquid 50 is received into the pathway 80 from a liquid source 22 at the input 82. Liquid 50 is communicated through the liquid pathway 80, combined with or affected by the liquid enhancement component in the cartridge 38 to form a beverage 54 that is dispensed at outlet 84 to dispensing area 86. The beverage 54 may be dispensed at the dispensing area 86 into a cup or receptacle for drinking or other uses. The belt 62, given the fact that it has multiple cartridge holding positions 92, may at one time hold a variety of different types of cartridges, including a variety of different liquid enhancement components. For example, the type of liquid enhancement component in the cartridge holding positions 92 on belt 62 may include a flavoring component, a soluble component, or a non-soluble component. The liquid enhancement component may also include a powder, a brew, a nutraceutical, a medicine, a mineral, a vitamin, an aroma, or any combination of the aforementioned enhancement components. These liquid enhancement components may include any type of flavor ingredient in addition to the aforementioned components. Furthermore, the liquid enhancement component may be any combination of the aforementioned liquid enhancement components where one of the liquid enhancement components interacts or reacts with another or with the liquid stream 50.

Figure 4:
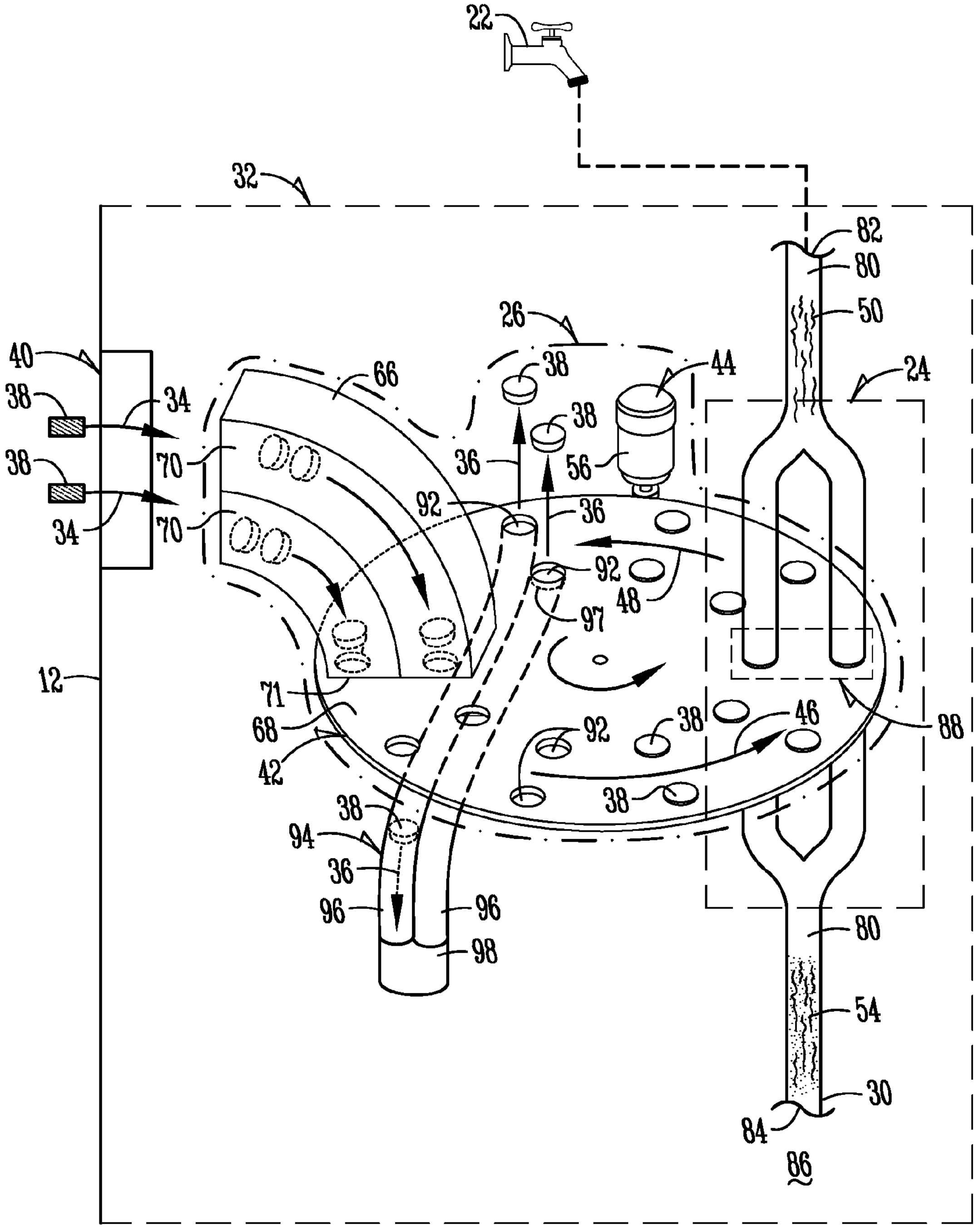
FIG. 4 is an illustration of another beverage preparation system of the invention.

FIG. 4 illustrates another embodiment for a beverage dispensing system 32 of the invention. Like the dispensing system 32 illustrated in FIG. 3, the system shown in FIG. 4 includes a cartridge loading/unloading interface 40. The interface 40 is positioned on a cabinet body 12, such as for example the cabinet body of a refrigerator. Through the interface 40 liquid enhancement cartridges 38 are inserted and/or retrieved from the cartridge storage, index and service system 26. In one aspect of the invention, the cartridge storage, index and service system 26 includes a cartridge storage system 42 comprising one or more chutes into which liquid enhancement cartridges 38 are loaded. Chutes 66 may be arranged in a parallel configuration whereby multiple chutes are combined providing multiple channels for housing a plurality of cartridges 38. The chutes have an inlet positioned proximate the interface 40 and an outlet in communication with carousel 68. Other aspects of the invention include clips or magazines being used in place of the chutes 66. The clips or magazines may be loaded with any number of cartridges 38 of a singular or varying flavor type, and placed through the interface 40 into the cartridge storage, index and service system 26 so that the outlet of each clip or magazine is in communication with the carousel 68. Other columns or channels may be configured, whether rigidly fixed within the system or removable, so as to hold a plurality of cartridges 38 proximate carousel 68.

The liquid enhancement cartridges 38 positioned within chute 66 are fed to the carousel 68 preferably by gravity. A mechanical or pneumatic system may also be used to feed liquid enhancement cartridges 38 from the inlet of chute 66 to the outlet disposed adjacent carousel 68. Therefore, cartridges 38 introduced into chute 66 via loading pathway 34 travel down the chute within each of the channels 70 from the inlet and are iterated toward the outlet of chute 66 as cartridges are loaded into cartridge holding positions 92 in carousel 68. An actuator may be configured at the outlet of each channel 70 in chute 66. The actuator may be configured to receive instructions from a control panel so as to release a cartridge 38 from chute 66 into a cartridge holding position 92 in carousel 68. When a cartridge is released from chute 66 the plurality of cartridges in each column 70 iterate toward the outlet of chute 66 proximate carousel 68. Carousel 68 is preferably a circular shaped table having an upright, mostly planar, loading surface housing a plurality of cartridge holding positions 92. In one aspect of the invention, the cartridge holding positions 92 in carousel 68 comprise hole pairs spaced radially on the top surface of carousel 68. The cartridge holding positions 92 may be fashioned in hole pairs as illustrated in FIG. 4. Alternatively, single cartridge holding positions 92 may be configured in carousel 68 and spaced radially along the top surface of carousel 68. The cartridge holding positions 92 may be configured in any array or arrangement so as to facilitate serial or parallel communication of one or more cartridges 38 into the beverage preparation position 88 upon rotation of carousel 68. Each cartridge holding position 92 is preferably shaped having a geometry to comport with the size and shape of the liquid enhancement cartridge 38. For example, in the case where the liquid enhancement cartridges are configured in an oval geometry, the cartridge holding positions 92 would also be configured in an oval geometry so that a portion, significant enough to hold the cartridge within the holding position 92, is received within the corresponding geometry (e.g., cartridge holding position 92) in carousel 68. The cartridges 38 may be retained at cartridge holding positions 92 by gravity or a mechanical or pneumatic actuator that retains a cartridge at each cartridge holding position 92.

Each cartridge holding position 92 could also include an ejector or release mechanism whereby spent or used cartridges 38 are ejected or released from carousel 68 after use at the beverage preparation position 88. Ejection of a cartridge 38 from a cartridge holding position 92 could be accomplished by the use of a mechanically or pneumatically actuated ejector that makes contact with and removes a cartridge from a cartridge holding position in carousel 68. Ejected cartridges could be collected in a bin associated with the cabinet body 12 of the refrigerator 10 whereby a user or operator is able to retrieve the ejected cartridges 38 from the bin (not shown). Cartridge holding positions 92 could also be configured with a pneumatic or mechanically actuated release mechanism that allows cartridges 38 to be released from a cartridge holding position 92 into a temporary holding basket where an operator or user could retrieve the cartridges for discarding them. Other embodiments include a discard system having one or more guideways 96 with an inlet 97 adjacent cartridge holding positions 92 in carousel 68. Each guideway 96 having a separate or combined outlet 98. The outlet of the discard system 94 may be positioned at an interface of the appliance accessible to an operator or use. For example, the outlet 98 of the discard system 94 could be configured to terminate at an outer skin of the cabinet body 12 so as to be retrievable by an operator or user each time a spent/used cartridge is released or ejected from the carousel. The ejector or release mechanism in the carousel for each cartridge holding position 92 is actuated and the cartridges are released into the guideway 96 through the inlet 97 proximate the carousel 68. Thus, used or spent cartridges 38 are ejected or released from the carousel into the discard system 94. The cartridges are communicated to a common collection point such as a collection bin (not shown) positioned at outlet 98 and accessible to a user or operator of the appliance.

User or operator access to carousel 68 would also permit retrieval of spent, used or otherwise unneeded cartridges from cartridge holding positions 92 in carousel 68 by being unloaded from carousel 68 along unloading pathway illustrated by arrows 36.

The cartridge storage, index and service system 26 also includes a cartridge indexing system 44. The cartridge indexing system 44 includes an actuator 56, such as an electric motor, operably connected to carousel 68 for imparting rotation to carousel 68 for moving cartridge holding positions 92 along a loading route 46 (e.g., moving cartridges into the beverage preparation position 88) and a retrieval route 48 (e.g., moving cartridges out of the beverage preparation position 88). Thus, carousel 68 is rotated by cartridge indexing system 44 so that cartridge holding positions 92 are moved in and out of the beverage preparation position 88. An actuator may be configured to facilitate the transfer of a cartridge from the cartridge storage system 42 into cartridge holding positions 92 in carousel 68. The system may also be configured whereby gravity iterates a cartridge from the cartridge storage system 42 into the cartridge holding positions 92 as the positions are rotated proximate the outlet 71 of the cartridge storage system 42. Cartridges 38 are rotated along the loading route 46 into the beverage preparation position 88. A tracking system may be used in combination with the beverage dispensing system 32 for identifying and cataloging the type of liquid enhancement cartridges housed at each one of the cartridge holding positions 92 in carousel 68. When the user or operator selects the type of beverage, the operating system for the beverage dispenser 32 instructs the cartridge indexing system 44 to move the appropriate cartridge into the beverage preparation position 88. Through a display (not shown) a user or operator may be apprised of the various types of liquid enhancement cartridges loaded in carousel 68, including those stored within cartridge storage system 42. In a preferred form, the cartridge holding positions 92 in carousel 68 would be a sufficient number to house a significant variety of liquid enhancement cartridges to provide a user or operator with a wide variety of beverage opportunities.

When the desired beverage is selected, cartridge indexing system 44 iterates carousel 68 so as to move the appropriate liquid enhancement cartridge 38 into the beverage preparation position 88. Liquid 50 received into guideway 80 at inlet 82 from liquid source 22 is communicated to the beverage preparation position and combined with or affected by the liquid enhancement component in the cartridge 38 so as to prepare a beverage 54 communicated from the beverage preparation position through guideway 80 to outlet 84 of dispenser 30 to a dispensing area for collection into a cup or receptacle. The beverage preparation system 24 may be configured so that multiple cartridges 38 are being dispensed from simultaneously or serially. As illustrated in FIG. 4, cartridge holding positions 92 are configured in pairs. In this configuration, one cartridge holding position 92 could include one component of the beverage and the adjacent cartridge holding position could include another component of the beverage, the two components being combined to prepare a final beverage for dispensing at the outlet 84 into the dispensing area 86. When preparation of the beverage is completed, the spent or used cartridges 38 are rotated out of the beverage preparation position 88 along retrieval route 48. The spent or used cartridges are then ejected, released or retrieved from the carousel 68. The empty cartridge holding positions 92 are then rotated into position at the outlet 71 of the cartridge storage system 42 whereby another cartridge or pair of cartridges are released from cartridge storage system 42 into cartridge holding positions 92 in carousel 68.

Figure 5:
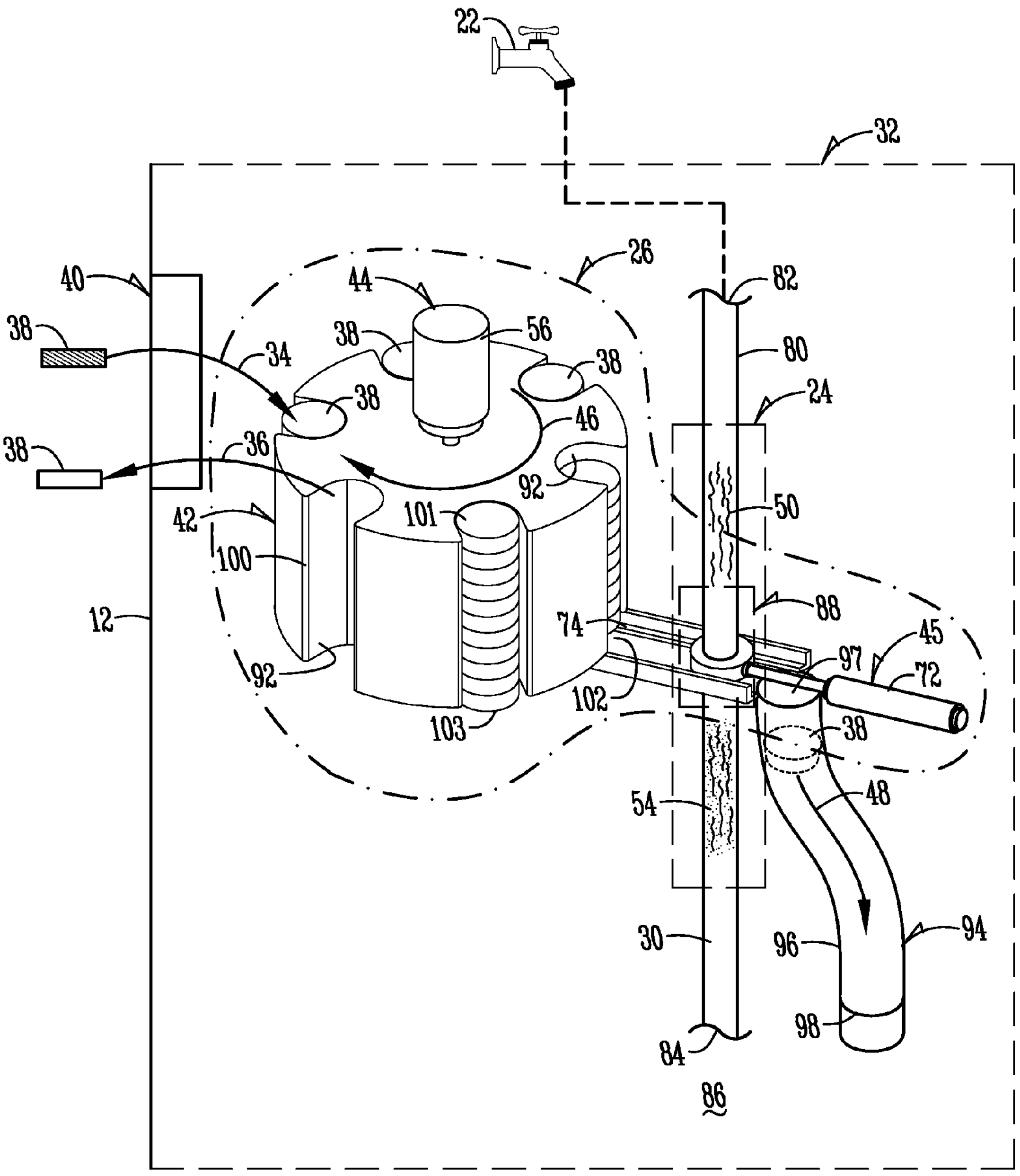
FIG. 5 is an illustration of a beverage preparation system of the invention.

FIG. 5 illustrates a beverage dispensing system 32 according to another aspect of the present invention. As with previous systems, the beverage dispensing system 32 illustrated in FIG. 5 includes a cartridge loading and unloading interface 40. Interface 40 is positioned preferably in a cabinet body of an appliance such as a refrigerator. Liquid enhancement cartridges 38 may be inserted and retrieved through the interface. Further details and description for the cartridge loading and unloading interface 40 is provided supra.

System 32 includes a cartridge storage, index and service system 26. System 26 comprises a cartridge storage system 42, a cartridge indexing system 44 and a cartridge service system 45. The cartridge storage system 42 includes a vertically arranged carousel 68 (similar to a poker chip carousel). In the carousel body along its vertical length are a plurality of cartridge holding positions 92. Each cartridge holding position is configured within a column 100 extending along a vertical length of the body of the carousel 68. Each column 100 has a geometric shape commensurate with the geometry of the liquid enhancement cartridge 38. A cartridge 38 is inserted through the cartridge loading and unloading interface 40 and stored at a cartridge holding position 92 within one of the columns 100 in carousel 68. The columns 100 in the body of carousel 68 may be configured so that the liquid enhancement cartridge 38 is wholly or partially contained in the body of carousel 68. The carousel may be configured with any number of columns 100 having a desired number of cartridge holding positions 92. The columns 100 may be spaced radially at the outer peripheral surface of carousel 68. Liquid enhancement cartridges 38 are received into each column 100 and stored/staged at a cartridge holding position 92 within the column 100. The columns 100 are configured so that a plurality of cartridges 38 may be stacked one on top of the other, one cartridge at each of the cartridge holding positions 92. Thus, a user or operator inserts a cartridge 38 through the cartridge loading and unloading interface 40 into one of the cartridge holding positions 92 in a column 100. The beverage dispensing system 32 may include a tracking system for monitoring and cataloging the types of liquid enhancement cartridges 38 stored in one of the cartridge holding positions 92 of carousel 68. A display associated with the cabinet body 12 of the appliance, such as a refrigerator, may be used to apprise the operator or user of the varying types of liquid enhancement cartridges stored in carousel 68 at any given time.

When loading or moving a cartridge into a staging position associated with the beverage preparation position 88, a cartridge indexing system 44 including an actuator 56 imparts rotation to carousel 68. Cartridges loaded into cartridge holding positions 92 in carousel 68 are rotated into a staging position proximate the beverage preparation position along loading route 46. Depending upon the desired beverage, the cartridge indexing system 44 may receive instructions from the operating system to rotate the carousel 68 so as to move the desired liquid enhancement cartridge into a staging position adjacent the beverage preparation position 88.

The beverage dispensing system 32 illustrated in FIG. 5 also includes a cartridge service system 45 positioned at the staging position 102. The cartridge service system 45 includes a shuttle 72 for providing movement of the cartridge along track 74 into the beverage preparation position 88. When the liquid enhancement cartridge 38 is moved into the beverage preparation position 88, the next liquid enhancement cartridge 38 in column 100 drops to take the position of the cartridge moved into the beverage preparation position. The vertical movement of cartridges through columns 100 of each of the cartridge holding positions 92 may be performed by mechanical or pneumatic actuation. In a preferred form, cartridges are iterated vertically downward through column 100 from an inlet 101 to an outlet 103 at the bottom most part of carousel 68 by gravity. At the staging position 102, a liquid enhancement cartridge is picked up by shuttle 72 and delivered via track 74 to beverage preparation position 88. Other cartridge service systems are contemplated. For example, a carrier driven by a piston or belt could be included so as to move a cartridge from the staging position 102 to the beverage preparation position 88. Liquid from a source 22 is communicated through inlet 82 of guideway 80. Liquid 50 combines with or is affected by the liquid enhancement component contained in the cartridge 38. A final or complete beverage 54 is prepared as liquid 50 from the source 22 combines with or is affected by the liquid enhancement component in cartridge 38. The beverage is dispensed from the guideway 80 at outlet 30 into dispensing area 86 where collected by a cup or receptacle. Spent or used liquid enhancement cartridges 38 are retracted back toward the staging position 102 from the beverage preparation position so as to be in communication with discard system 94. The spent or used cartridge 38 is released or ejected from shuttle 72 into an inlet 97 of a discard system 94. A guideway 96 carries the spent or used cartridge along retrieval route 48 to an outlet 98 where a user or operator may collect the spent or used liquid enhancement cartridges. The outlet may be conveniently positioned on the cabinet body 12 of a refrigerator 10 (FIG. 1) so that spent cartridges are released to a location where a user may retrieve and discard them. Depending upon the desired beverage, cartridge indexing system 44 may rotate carousel 68 so as to move the desired liquid enhancement cartridge 38 into the staging position 102. The desired cartridge is then moved by the cartridge service system 45 into the beverage preparation position where a beverage can be prepared for dispensing at the dispensing area 86. A system for monitoring, tracking and cataloging the different types of cartridges stored by the carousel may also be used to monitor the availability of the selected beverage, depending upon the cartridges stored in the carousel 68 and if a column 100 of cartridge holding positions 92 is empty or running low of liquid enhancement cartridges 38 or a particular type of liquid enhancement component.

Figure 6A:
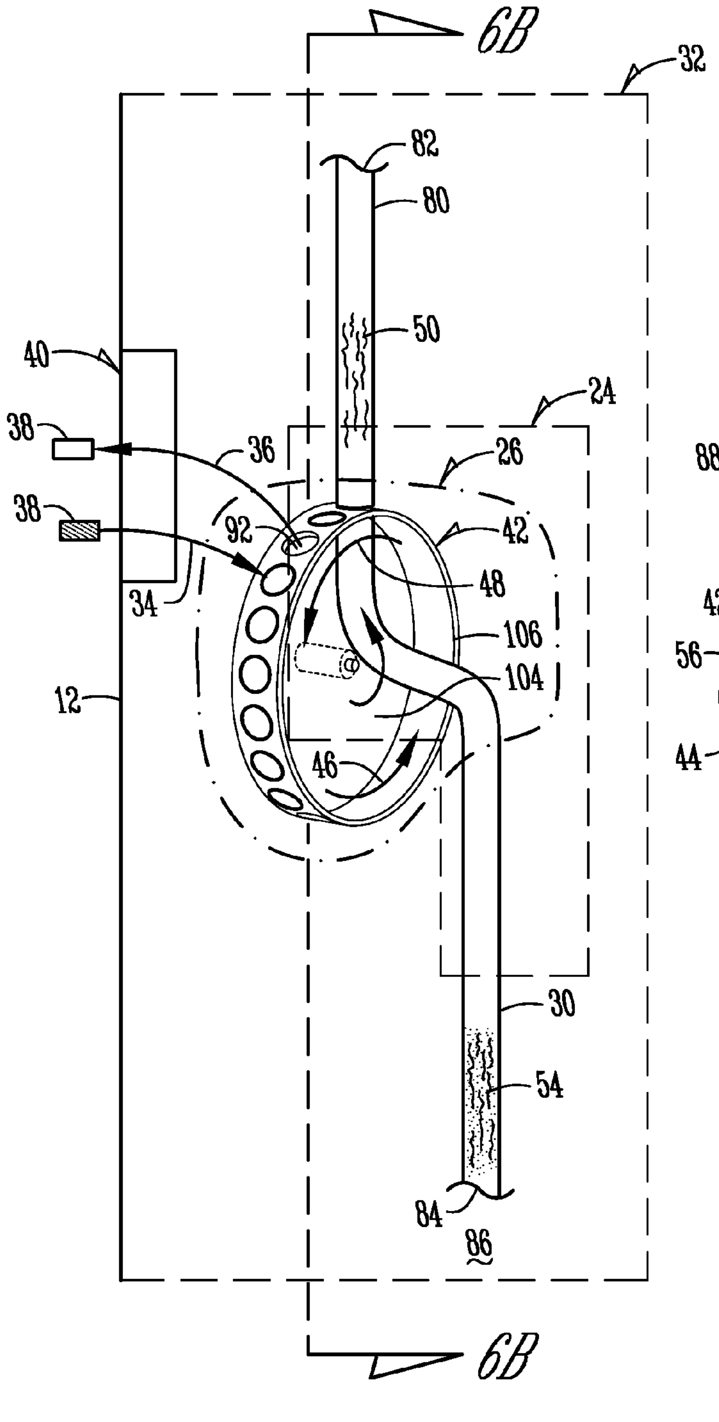
FIG. 6A is an illustration of another beverage preparation system.
Figure 6B:
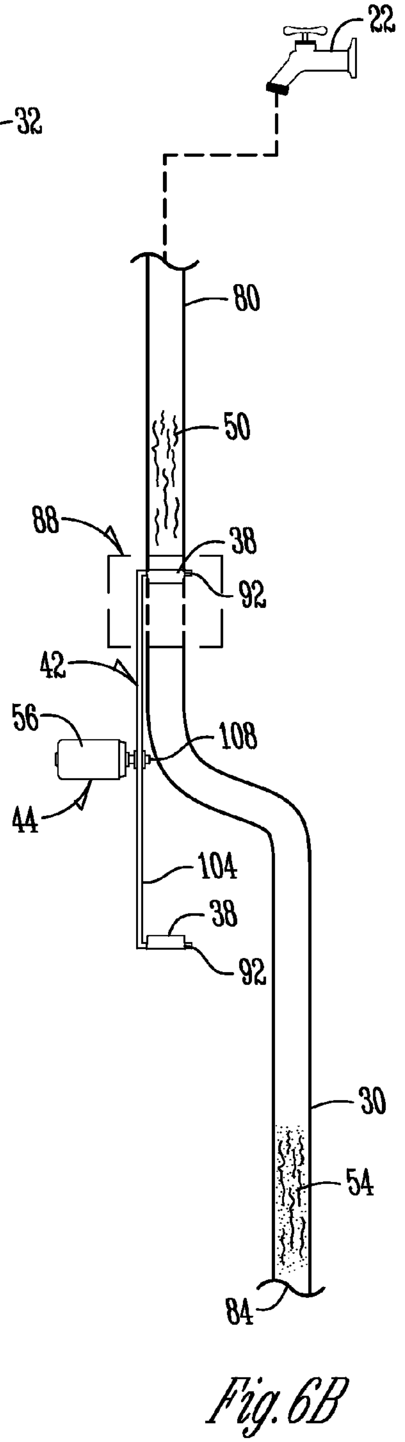
FIG. 6B is a cross-sectional view taken along line 6B-6B in FIG. 6A.

FIG. 6A-6B illustrate another beverage dispensing system 32 of the invention. As with those described supra, system 32 includes a cartridge loading and unloading interface 40 positioned in the cabinet body 12 of the appliance. For example, the refrigerator could include an interface allowing for cartridge loading and unloading on an external portion accessible by an operator or user. Liquid enhancement cartridges 38 are inserted and retrieved through interface 40. Cartridges 38 are loaded as illustrated by arrow 34 and retrieved or unloaded as indicated by arrow 36. As with previous embodiments, the present invention contemplates discard systems for collecting spent or used cartridges ejected or released as previously illustrated and described. In the case of manual cartridge retrieval, an operator or user could retrieve a spent or used cartridge through interface 40 or some other portal or window providing access to the system.

In FIG. 6A, the cartridge storage, index and service system 26 includes a cartridge storage system 42 and cartridge indexing system 44. The cartridge storage system 42 comprises a wheel 104 having an outer rim 106. Configured into the outer rim 106 of wheel 104 are a plurality of cartridge holding positions 92. The plurality of cartridge holding positions 92 are radially spaced along the outer rim 106 of wheel 104. Each cartridge holding position 92 includes an aperture for at least partially or completely receiving a liquid enhancement cartridge 38. A mechanical or pneumatic actuator at each cartridge holding position 92 may be used to retain the cartridge at the cartridge holding position 92. For example, the cartridge holding position 92 may be configured to have a geometry commensurate with the geometry of the liquid enhancement cartridge so that when the cartridge is inserted into the cartridge holding position 92 a vacuum system retains the cartridge there until the vacuum system is cut off and the used or spent cartridge is removed or retrieved from the cartridge storage system 42. Cartridge 38 may be mechanically retained within cartridge holding position 92. An actuated lever in the cartridge holding position 92 could engage a detent in the liquid enhancement cartridge 38 to thereby hold the cartridge at the cartridge holding position 92. The lever may be actuated out of the detent to release or eject the cartridge from the cartridge holding position.

The cartridge storage, index and service system 26 shown in FIGS. 6A-B also includes a cartridge indexing system 44. In one aspect of the invention, the cartridge indexing system 44 comprises an actuator 56, such as an electric or pneumatic motor operably connected to a hub portion 108 of wheel 104. Cartridges 38 loaded into cartridge holding positions 92 are rotated into the beverage preparation position 88 along loading route 46 and rotated out of the beverage preparation position 88 along retrieval route 48. As best illustrated in FIG. 6B, liquid 50 passing through a guideway 80 connected to a source 22 flows through the cartridge 88 to combine with or be affected by a liquid enhancement component within the cartridge for preparing a finished or complete beverage 54. After the beverage has been prepared, the spent or used cartridge 38 is rotated out of the beverage preparation position by the cartridge indexing system 44 and ejected or removed from the cartridge storage system 42. The beverage dispensing system 32 may include an operating system for detecting, storing and cataloging the different types of liquid enhancement cartridges stored in each of the cartridge holding positions 92 of the cartridge storage system 42. An interface on the cabinet body 12 of refrigerator 10 (FIG. 1) may be used for selecting the type of beverage. Depending upon the type of beverage selected, the cartridge indexing system 44 moves the cartridge holding position carrying the selected liquid enhancement cartridge to the beverage preparation position 88 for preparing the selected beverage. The spent or used cartridge is then retrieved through interface 40 or ejected to a discard system (described and illustrated supra) where the user or operator may collect and subsequently discard or recycle it.

Figure 7:
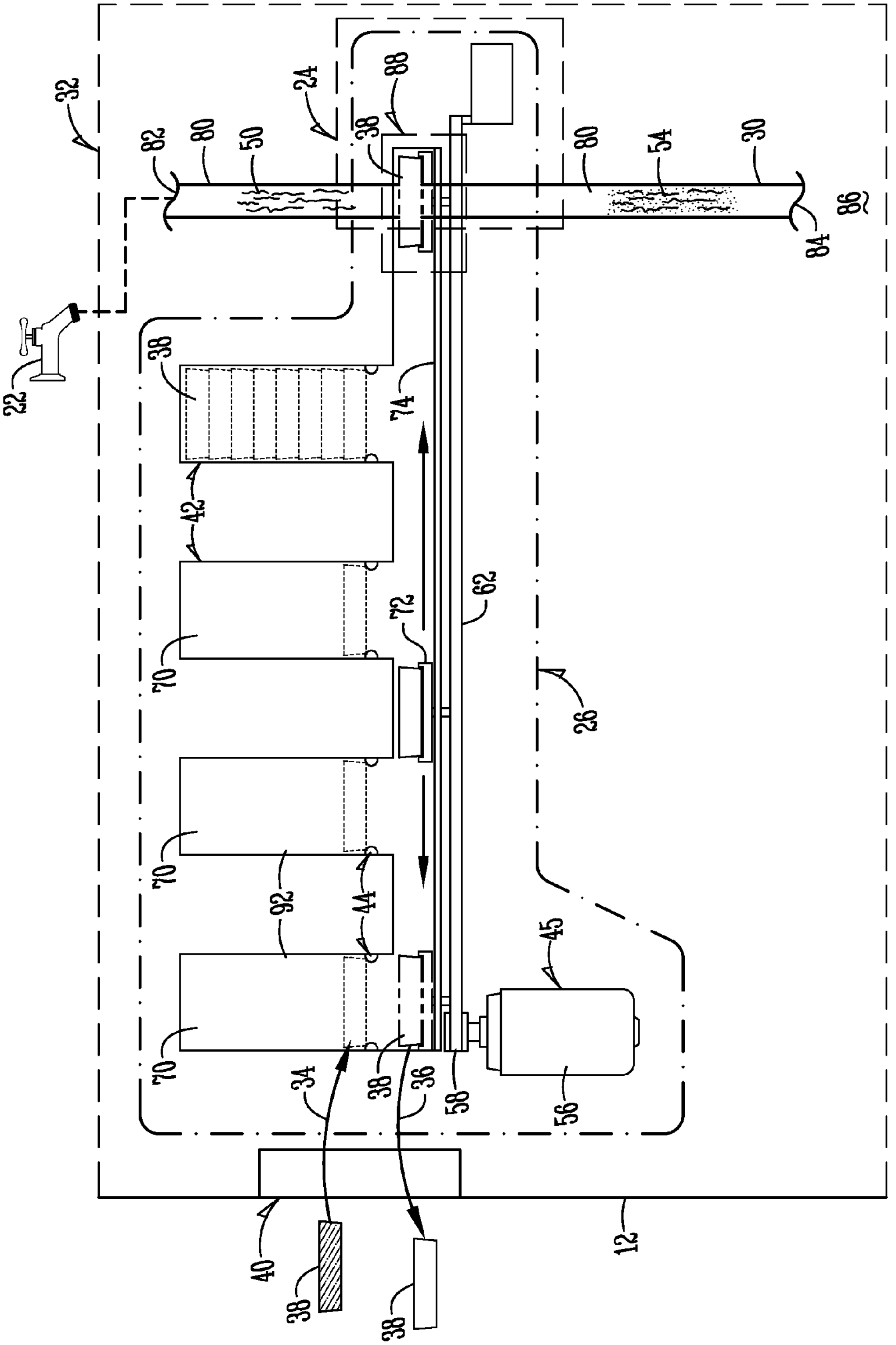
FIG. 7 illustrates another beverage preparation system of the present invention.

FIG. 7 illustrates a beverage dispensing system 32 for the present invention. As with others described and illustrated supra, the system 32 includes an interface 40 through which liquid enhancement cartridges 38 are inserted and retrieved. For example, a cartridge 38 may be loaded into the cartridge storage, index and service system 26 along the path indicated by arrow 34. Spent or used cartridges may be retrieved from the cartridge storage, index and service system along the path indicated by arrow 36.

The beverage dispensing system 32 shown in FIG. 7 also includes a cartridge storage, index and service system 26 that includes a cartridge storage system 42. Included in the cartridge storage system 42 are a plurality of cartridge holding positions 92. In one aspect of the invention the cartridge holding positions 92 are a plurality of vertically oriented, parallel channels 70 for holding a plurality of liquid enhancement cartridges stacked one on top of another within the channels 70. In other aspects of the invention, the cartridge holding positions 92 include a magazine or a clip whereby a plurality of liquid enhancement cartridges 38 are inserted into the magazine or clip which is in turn attached to the cartridge indexing system 44. The cartridges may be gravity fed into the cartridge indexing system 44. Mechanical and pneumatic means may also be provided for moving cartridges from channels 70 to the cartridge indexing system 44. One or more actuators may be included at the outlet of each channel 74 preventing movement of a cartridge 38 from the channel to the cartridge indexing system 44. As discussed supra, these actuators may be mechanical or pneumatic for iterating cartridges 38 downward through channels 70 to the cartridge indexing system 44. The cartridge indexing system 44 permits movement of cartridges through channels 70 to the cartridge service system 45. The cartridge service system 45 includes an actuator 56, such as an electric or pneumatic motor, operably connected to a belt 62. Attached to the belt 62 is a shuttle 72 that rides a track 74. Instructions provided from an operating system to the actuator 56 impart rotation to belt 62 which in turn provides horizontal translation of shuttle 72 back and forth along the length of track 74. When a specific beverage is selected, the shuttle 72 is positioned beneath the cartridge held in one of the channels 70. The indexing system 44 actuates and allows the cartridge 38 to drop onto the shuttle 72. The shuttle 72 moves the liquid enhancement cartridge 38 into the beverage preparation position. Liquid 50 from a liquid source 22 enters a guideway 80 through an inlet 82 of the beverage preparation system 24. Other cartridge service systems, such as those discussed and illustrated supra are also contemplated. Liquid 50 combines with or is affected by the liquid enhancement component within the cartridge 38 to prepare a complete or final beverage 54 for dispensing at the outlet 84 into a dispensing area 86 associated with dispenser of an appliance such as a liquid dispenser of a refrigerated appliance. The used or spent liquid enhancement cartridge 38 is retrieved from the beverage preparation position 88. The spent or used cartridges are ejected, released or manually retrieved by an operator or user of the system. The operating system may be configured to track, identify and catalog the various types of cartridges stored in each of the channels 70 of the cartridge storage system 42. When a desired beverage is selected at an interface of the appliance, instructions are provided to the cartridge service system 45 for positioning the shuttle 72 beneath the appropriate cartridge 38. The cartridge indexing system 44 actuates and releases the cartridge from channel 70 into shuttle 72. The shuttle moves the desired cartridge 38 into the beverage preparation position 88 of the beverage preparation system 24.

Figure 8:
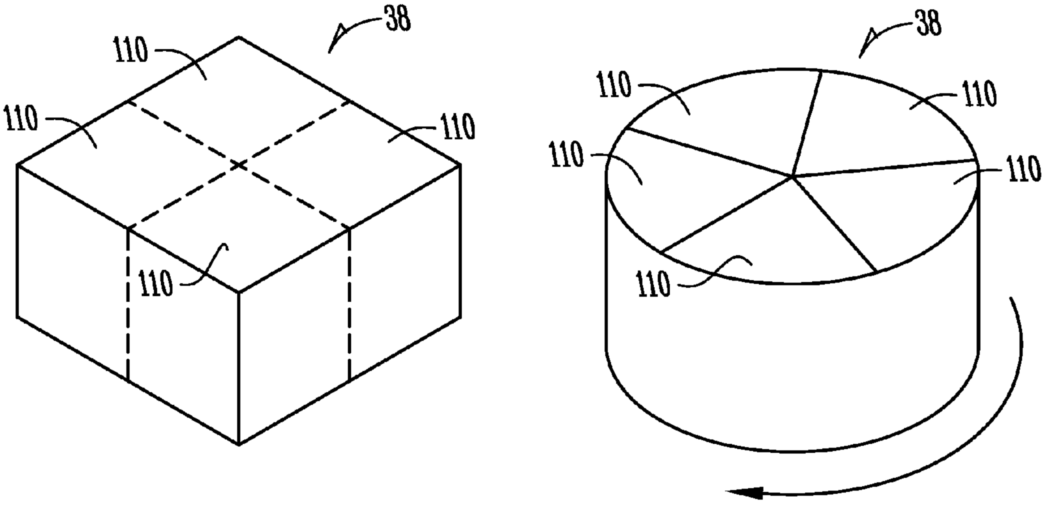
FIG. 8 illustrates various embodiments of a liquid dispensing cartridge of the present invention.

FIG. 8 illustrates various aspects of the liquid enhancement cartridge 38 of the present invention. In one aspect of the invention, the liquid enhancement cartridge includes a disc segmented into a plurality of sub-compartments 110. Each sub-compartment 110 includes a quantified amount of a liquid enhancement component. Depending upon the strength of the desired beverage, one or more sub-compartments 110 of cartridge 38 may be dispensed from. For example, if a weaker beverage is desired the system may be configured to dispense from a fewer number of the sub-compartments 110, whereas if a stronger beverage is desired the system may be configured to dispense from all or most of the sub-compartments of cartridge 38. For example, in one aspect of the invention, the cartridge service system 45 as previously described and illustrated may be configured with an actuator for providing rotation to the cartridge at the beverage preparation position. Depending upon the number of sub-compartments 110 being dispensed from, the system may be configured to rotate cartridge 38 after each sub-compartment 110 is dispensed from, thereby dispensing from a desired number of sub-compartments 110 to create a finished or complete beverage of a desired strength. In another aspect of the invention, the liquid enhancement cartridge 38 may be configured geometrically as a cube. The cube shaped liquid enhancement cartridge 38 may be divided up into sub-compartments 110 holding a quantified amount of a liquid enhancement component. The liquid enhancement component from one sub-compartment 110 may be dispensed by piercing a top and bottom portion or rupturing a top and bottom portion of each compartment. Depending upon the strength of the desired beverage, one or more of the sub-compartments 110 may be dispensed from for controlling the strength of the finished or prepared beverage.

The preferred embodiments of the present invention have been set forth in the drawings and the specification and, although specific terms are employed, these are used in the generically descriptive sense only and are not used for the purpose of limitation. Changes in the form proportion of parts as well as in the substitution of equivalents are contemplated as circumstances may suggest or are rendered expedient without departing from the spirit or scope of the invention as further defined in the following claims.

What is claimed is:

1. A multi-single serve cartridge beverage dispensing system comprising:

a cartridge loading interface, the interface configured to receive a cartridge having a liquid enhancement component;

a storage system associated with the cartridge loading interface, the storage system comprising a storage device having a plurality of cartridge holding positions for staging cartridges proximate a beverage preparation position; and an indexing system comprising means for moving one or more of the cartridges into a liquid pathway at the beverage preparation position for passing liquid through the cartridge for preparing and dispensing a beverage at a dispensing area;

wherein the cartridge is segmented into multiple sub-compartments for controlling the concentration of the beverage.

2. The system of claim 1, wherein the storage device comprises one or more channels, belts, chutes, columns, carousels, magazines, or wheels having cartridge holding positions for storing a plurality of cartridges.

3. The system of claim 1, wherein the indexing system comprises an actuator for moving or rotating the storage device for staging a cartridge in the storage device at the beverage preparation position.

4. The system of claim 1, wherein the indexing system further comprises a cartridge service system having a shuttle for moving a cartridge from the storage system into the beverage preparation position.

5. The system of claim 1 in combination with:

a. a refrigerator; or b. an ice/water dispenser of a refrigerator.

6. The system of claim 5, wherein the beverage preparation position comprises a location in a liquid pathway of the dispenser between:

a. an inlet in communication with a liquid source; and b. an outlet in communication with a dispensing area.

7. The system of claim 1 in combination with a host appliance comprising one of:

a. a countertop/tabletop water dispenser;

b. a water dispensing cabinet;

c. a beverage vending machine.

8. A method for dispensing a beverage from a host appliance by storing and dispensing from multiple beverage cartridges, the method comprising:

providing a beverage dispensing system at the host appliance having a beverage preparation position;

introducing a plurality of cartridges having a liquid enhancement component into the host appliance;

staging the cartridges at the beverage preparation position in a cartridge holder;

indexing the cartridge holder or a cartridge from the holder into the beverage preparation position;

dispensing liquid to the beverage preparation position to pass through the cartridge for dispensing a beverage from the host appliance; and iterating the cartridge holder or a cartridge at the beverage preparation position for preparing another beverage;

controlling concentration levels of the beverage by dispensing from one or more sub-compartments in the cartridge.

9. The method of claim 8, wherein the indexing step comprises moving or rotating the cartridge holder for staging one or more cartridges at the beverage preparation position.

10. The method of claim 8, wherein the indexing step comprises shuttling the cartridge from the cartridge holder into the beverage preparation position.

11. The method of claim 8 further comprising the step of preparing a beverage having a first drink strength by dispensing from a first number of sub-compartments of the cartridge and another beverage having a second drink strength greater than the first drink by dispensing from a second number of sub-compartments of the cartridge greater than the first number of sub-compartments.

12. The method of claim 8, wherein the host appliance comprises:

a. a refrigerator;

b. a liquid dispensing appliance.

13. The method of claim 8, wherein the introducing a plurality cartridges step comprises introducing a plurality of types of cartridges.

14. The method of claim 8, wherein the dispensing liquid step comprises rupturing a membrane or a seal located on the cartridge.

15. The method of claim 8 further comprising the step of tracking the type of cartridge after the step of introducing a plurality of cartridges.

16. A multi-single serve cartridge beverage dispensing system comprising:

a cartridge loading interface, the interface configured to receive a cartridge having a liquid enhancement component;

a storage system associated with the cartridge loading interface, the storage system comprising a storage device having a plurality of cartridge holding positions for staging cartridges proximate a beverage preparation position;

a tracking system associated with the cartridge loading interface, the tracking system configured to identify and catalog a type of cartridge received; and an indexing system comprising means for moving one or more of the cartridges into a liquid pathway at the beverage preparation position for passing liquid through the cartridge for preparing and dispensing a beverage at a dispensing area;

wherein the cartridge is segmented into multiple sub-compartments for controlling the concentration of the beverage.

17. The system of claim 16 further comprising a display of available types of cartridges.

18. The system of claim 17 further comprising a selection input where a user may select one or more of the available types of cartridges.

19. The system of claim 18 further comprising an operating system for moving the indexing system such that a selected type of cartridge is moved into the liquid pathway.

* * * * *